July 21, 1964

O. RUBIO-MEDINA 3,141,984

HIGH SPEED COMMUTATOR

Filed April 17, 1962

Inventor
Oscar Rubio-Medina
By Robert B. Benson
Attorney

United States Patent Office 3,141,984
Patented July 21, 1964

3,141,984
HIGH SPEED COMMUTATOR
Oscar Rubio-Medina, Cincinnati, Ohio, assignor to Allis-Chalmers Manufacturing Company, Milwaukee, Wis.
Filed Apr. 17, 1962, Ser. No. 188,034
7 Claims. (Cl. 310—236)

This invention relates generally to commutators for dynamoelectric machines. More specifically this invention relates to commutators for high speed dynamoelectric machines.

Commutators for electric motors and generators are usually made of a plurality of conductor bars which are attached to a hub which in turn is mounted on the shaft of the motor or generator. If the shaft runs at high speed (for example 4000 to 5000 r.p.m.), a large centrifugal force is built up in the commutator bars and they tend to pull away from their hub. If the bars are not uniformly mounted on the hub there tends to be uneven deflection in the bars which in turn causes excessive wear on the commutator brushes. It further causes a poor electrical connection between the brush and the bars. In many cases, if a portion of the bar deflects relative to the rest of the bar a dangerously high bending stress is built up in the commutator bar causing a premature failure of the commutator.

In the usual design of commutators, the commutator is made up of a circular stack of elongated copper segments or bars which have V-shaped notches at both ends. These notches align with the notches in the other bars to form a circular groove. Retaining rings having V-shaped projections are wedged into the annular grooves and mounted on the hub of the commutator by suitable clamping means such as a nut. The copper bars frequently include a tang member which extends radially outward from one end of the assembled commutator and is provided with slots for receiving the armature wires.

In commutators such as described above, the portions of the conductor bars immediately above the grooved sections tend to deflect outwardly when subjected to large centrifugal forces such as when operating at high speed. The deflection in these portions of the commutator bars frequently exceeds seven times the acceptable or desired deflection for the bar. Furthermore, the bending stresses set up in these bars sometimes approaches as much as 60,000 pounds per square inch which is 50% above the tensile strength of the material normally used for the bar. Even when prestressed to compensate for the centrifugal forces anticipated many of these commutator bars failed in bending stress when operating at high speeds.

The commutator of this invention overcomes the problems mentioned above in connection with the commonly used commutators by calling for a retaining band formed around the edges of the commutator bars to oppose the radial outward motion of these segments due to centrifugal force. More particularly these retaining bands are made up of a thin tape impregnated with a thermal setting resin so as to form a solid retaining ring of electrically nonconducting material when the tape is cured.

Therefore, it is the object of this invention to provide a new and improved commutator for dynamoelectric machines.

Another object of this invention is to provide a new and improved commutator for high speed dynamoelectric machines.

Another object of this invention is to provide a commutator for dynamoelectric machines having new and improved retaining means for opposing centrifugal force acting on the bars of the commutator.

Other objects and advantages of this invention will be apparent from the following description when read in connection with the accompanying drawings in which.

Figure 1:
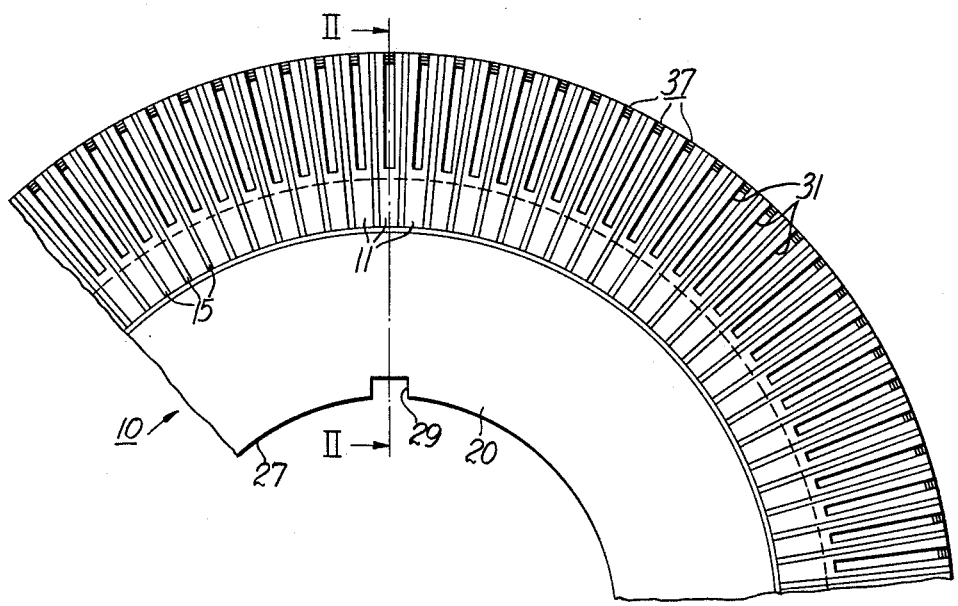
FIG. 1 is a partial end view of the commutator of this invention.
Figure 2:
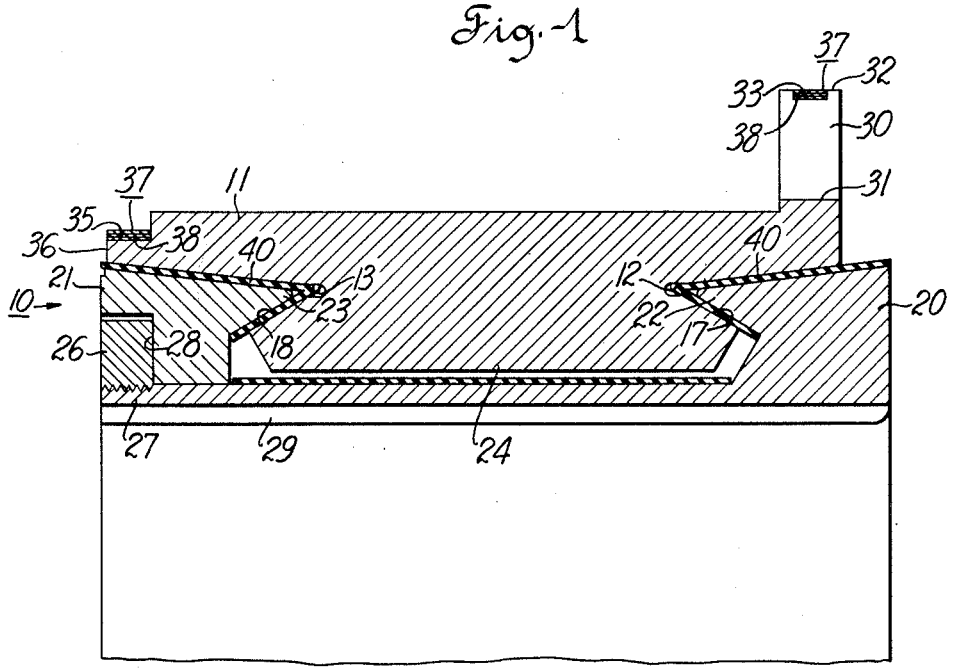
FIG. 2 is a cross sectional view taken along line II—II of the commutator.

Referring more specifically to the drawing, this invention is illustrated in a commutator 10 comprising a plurality of arcuately spaced conductor bars 11 having notches 12, 13 at each end. Suitable spacers 15 of electrical insulation are positioned between adjacent bars 11. The notches 12 are aligned to form an annular dovetail groove 17 at one end of the assembled conductor bars and notches 13 are aligned to form dovetail groove 18 at the other end of the bars.

Annular clamping rings 20, 21 having V-shaped projections 22, 23, respectively, are positioned at either end of the assembled conductor bars with the projections 22, 23 fitting into the annular dovetail grooves 17, 18, respectively. The clamping rings 20, 21 are adapted to be mounted on the shaft of a dynamoelectric machine. In the illustrated embodiment, the rings 20, 21 are connected together and wedged into engagement with the commutator bars 11 by a commutator nut 26 which threadedly engages the end of the axially extending hub or sleeve 27 formed integrally with the clamp 20 and engages in abutting relationship the outer surface 28 of the other clamping ring 21. The sleeve is provided with an axially extending keyway 29 for receiving a key extending outward from a power transmission shaft.

The commutator bars 11 of the preferred illustrated commutator are generally elongated thin copper members with V-shaped grooves at each end. The section between and beneath the grooves form a projection 24 that is easily mounted between clamping rings. At the inner end each bar is provided with a radially outwardly extending tang member 30 which is slotted at 31 for receiving the wires from the motor or generator armature. The radially outer surface 32 of this tang member 30 is provided with a shallow recess or groove 33. Likewise, a shallow recess or groove 35 is formed in the outer surface 36 at the other end of the commutator bar 11. Preferably this groove 35 is positioned as close to the end of the bar as possible. If the bars do not have a tang member, then a similar groove or recess is formed in the bar where the tang would normally be placed.

In commutators as described above the section of the bars 11 above the notches 12 and 13 tend to deflect outward when subjected to large centrifugal forces when operating at high speeds. Naturally the greatest deflection occurs at the ends of the bar and gradually tapers down to the bottom of the notch. On the other hand, the bending stress in the bar is greatest in the material just above the end of the notch. It is in this area that the bars usually fail during operation. Hence, to most effectively overcome this problem retaining bands 37 are located near the extreme ends of the bars. For this reason the shallow recesses 33, 35 mentioned above are located near the extreme ends of the commutator bars.

The retaining rings or bands 37 are positioned in the grooves 33, 35 for holding the commutator bars in position during operation. Preferably as shown these retaining rings 37 are made up of layers of a narrow tape 38 impregnated with a suitable thermal setting material. Such a tape and thermal setting resin are fully described in U.S. Patent 2,747,118, A. D. Coggeshall, May 22, 1956. The roving type material or tape described in Coggeshall is preferable in this application because of its superior strength in tension and its low elasticity under strain. However, such a tape is not a requirement and a woven type tape would be satisfactory in many applications.

As shown in the drawing, the commutator bars are separated from each other by a suitable spacer 15 of insulating material and from the clamping rings by a thin sheet 40 of insulation. Preferably the insulation is a mica bearing material and is positioned between commutator bars and the retaining rings during assembly as is well-known in the art.

In manufacturing the illustrated commutator, the copper conducting bars 11 and the intervening insulation spacers 15 are assembled on the sleeve portion 27 of clamping ring 20 with the insulated V-shaped projection 22 fitted within the dovetail groove 17 formed by the aligned notches 12 in the commutator bars. When all of the conductor bars and spacers have been assembled, a suitable sheet of insulation is positioned over the top and V-shaped projection 23 of the clamping ring 21. Then that clamping ring is positioned with its V-shaped projection 23 within the annular dovetail groove 18 at the other end of the conductor bars. The commutator nut 26 is then threaded on the sleeve of clamping member 20 and abuts the outer surface 28 of clamping member 21 so as to force the clamping rings together and thereby firmly mount the assembled commutator bars and insulators on the sleeve.

At this point the assembled commutator may be placed on a mandrel so that the outer surface of the bars can be turned down if necessary to obtain a true cylindrical surface. The banding tape 38 is then wound in the recesses 33, 35 on the external surface of the commutator bars. As shown in the drawing the retaining bands are positioned within the shallow recesses so that in the final assembled condition the banding material does not extend radially outward beyond the surface of the commutator bars. The entire assembly is then heated to cure the thermal setting resin in the retaining bands and thereby form solid, rigid, strong, retaining bands.

Although but one embodiment of this invention has been illustrated and described, it will be apparent to those skilled in the art that various modifications and changes can be made therein without departing from the spirit of the invention or the scope of the appended claims.

Having now particularly described and ascertained the nature of my said invention and the manner in which it is to be performed, I declare that what I claim is:

1. A commutator for a dynamoelectric machine comprising: a hub adapted to be mounted on a shaft, a plurality of individually connecting bars arcuately spaced around the periphery of said hub, said bars having notches at each end that combine to form an annular groove at each end, clamping means having projections positioned in said grooves for mounting said bars on said hub, the outer surface of said bars extending radially outward beyond said hub and said clamping means, a shallow recess formed in the outer surface of said bars near the ends of said bars, and a retaining band mounted in said recesses for preventing radial outward movement of said bars.

2. A commutator for a dynamoelectric machine comprising: a hub adapted to be mounted on a shaft, a plurality of individually connecting bars arcuately spaced around the periphery of said hub, said bars having notches at each end that combine to form an annular groove at each end, clamping means having projections positioned in said grooves for mounting said bars on said hub, the outer surface of said bars extending radially outward beyond said hub and said clamping means, a shallow recess formed in the outer surface of said bars near each end of said bars, and retaining bands mounted in said recesses for preventing radial outward movement of said bars, said retaining bands comprising a tape impregnated with a thermal setting resin to form a rigid retaining band upon curing.

3. A commutator for a dynamoelectric machine comprising: a hub adapted to be mounted on a shaft, a plurality of individually connecting bars arcuately spaced around the periphery of said hub, said bars having notches at each end that combine to form an annular groove at each end, clamping means having projections positioned in said grooves for mounting said bars on said hub, the outer surface of said bars extending radially outward beyond said hub and said clamping means, a shallow recess formed in the outer surface of said bars near each end of said bars, and retaining bands mounted in said recesses for preventing radial outward movement of said bars, said retaining bands comprising a roving impregnated with a thermal setting resin to form a rigid retaining band upon curing.

4. A commutator for a dynamoelectric machine comprising: a sleeve adapted to be mounted on a shaft, a plurality of longitudinally extending conductor bars mounted on said sleeve and being arcuately spaced around the periphery thereof, insulated spacers positioned between adjacent bars, said bars having V-shaped notches at each end which are aligned to form annular dovetail grooves, a pair of clamping members having V-shaped annular projections extending therefrom, said clamping members being positioned with their V-shaped projections within said dovetail grooves of said conducting bars, insulation means separating said clamps and said conductor bars, means for wedging said clamping means into said grooves for mounting said bars on said sleeve, a recess in the external surface of each end of said conductor bars, thermal setting retaining means positioned in said recesses, said thermal setting retaining means forming a solid retaining band upon curing.

5. A commutator for a dynamoelectric machine comprising: a sleeve adapted to be mounted on a shaft, a plurality of longitudinally extending conductor bars mounted on said sleeve and being arcuately spaced around the periphery thereof, insulated spacers positioned between adjacent bars, said bars having V-shaped notches at each end which are aligned to form annular dovetail grooves, a pair of clamping members having V-shaped annular projections extending therefrom, said clamping members being positioned with their V-shaped projections within said dovetail grooves of said conducting bars, insulation means separating said clamps and said conductor bars, means for wedging said clamping means into said grooves for mounting said bars on said sleeve, a recess in the external surface of each end of said conductor bars between the end of said bar and the bottom of V-shaped notches, and thermal setting retaining means positioned in said recesses, said means forming a solid retaining band upon curing.

6. A commutator for a dynamoelectric machine comprising: a sleeve adapted to be mounted on a shaft, a plurality of longitudinally extending conductor bars mounted on said sleeve and being arcuately spaced around the periphery thereof, said bars having a radially outwardly extending flange at one end, insulated spacers positioned between adjacent bars, said bars having V-shaped notches at each end which are aligned to form annular dovetail grooves, a pair of clamping members having V-shaped annular projections extending therefrom, said clamping members being positioned with their V-shaped projections within said dovetail grooves of said conducting bars, insulation means separating said clamps and said conductor bars, means for wedging said clamping means into said grooves for mounting said bars on said sleeve, a recess in the external surface of said flange and the external surface of the other end of said conductor bars, retaining means comprising a tape impregnated with a thermal setting resin positioned in said recesses, said tape forming a solid retaining ring upon curing.

7. A commutator for a dynamoelectric machine comprising: a sleeve adapted to be mounted on a shaft, a plurality of longitudinally extending conductor bars mounted on said sleeve and being arcuately spaced around the periphery thereof, insulated spacers positioned between adjacent bars, said bars having V-shaped notches at each end which are aligned to form annular dovetail grooves, a first and second clamping member having V- shaped annular projections extending therefrom, said first clamp member being formed integral with said sleeve, said clamping members being positioned with their V-shaped projections within said dovetail grooves of said conducting bars, insulation means separating said clamps and said conductor bars, a nut threadedly engaging said sleeve and abutting said second clamping member for moving said clamping members toward each other and into said grooves to mount said bars on said sleeve, a recess in the external surface of each end of said conductor bars, retaining means comprising a tape impregnated with a thermal setting resin positioned in said recesses, said tape forming a solid retaining band upon curing.

References Cited in the file of this patent
UNITED STATES PATENTS

| | | |
|---|---|---|
| 479,179 | Wightman | July 19, 1892 |
| 1,075,502 | Scott | Oct. 14, 1913 |
| 2,660,683 | King | Nov. 24, 1953 |